United States Patent [19]

Bernard

[11] Patent Number: 5,101,467
[45] Date of Patent: Mar. 31, 1992

[54] CABLE HAVING EMBEDDED OPTICAL FIBER

[75] Inventor: Werner Bernard, Hickory, N.C.

[73] Assignee: Siecor Corporation, Hickory, N.C.

[21] Appl. No.: 618,259

[22] Filed: Nov. 23, 1990

[51] Int. Cl.[5] ............................................. G02B 6/44
[52] U.S. Cl. ...................................... 385/112; 385/113
[58] Field of Search .............. 350/96.20, 96.21, 96.22, 350/96.23; 385/109, 112, 113

[56] References Cited

U.S. PATENT DOCUMENTS

| | | | |
|---|---|---|---|
| 4,113,349 | 9/1978 | Stiles | 350/96.23 |
| 4,158,478 | 6/1979 | D'Auria et al. | 350/96.23 |
| 4,557,558 | 12/1985 | Bresser | 350/96.23 |
| 4,600,268 | 7/1986 | Spicer | 350/96.23 |
| 4,715,676 | 12/1987 | Sutehall et al. | 350/96.23 |
| 4,730,894 | 3/1988 | Arroyo | 350/96.23 |
| 4,743,085 | 5/1988 | Jenkins et al. | 350/96.23 |
| 4,892,382 | 1/1990 | Story et al. | 350/96.23 |
| 4,913,515 | 4/1990 | Braunmiller et al. | 350/96.23 |
| 4,941,729 | 7/1990 | Hardin et al. | 350/96.23 |
| 4,953,945 | 9/1990 | Nishimura et al. | 350/96.23 |
| 4,969,706 | 11/1990 | Hardin et al. | 350/96.23 |
| 4,993,804 | 2/1991 | Mayr et al. | 350/96.23 |

*Primary Examiner*—John D. Lee
*Assistant Examiner*—Phan T. Heartney
*Attorney, Agent, or Firm*—J. David Abernethy

[57] ABSTRACT

Disclosed is an optical transmission cable having one or more cable elements. Each cable element includes a plurality of optical fibers embedded in the outer surface of a plastic layer applied directly over an antibuckling member. When the plastic layer is silicone rubber, the optical fibers may be peeled away from the bundle by hand as desired.

4 Claims, 3 Drawing Sheets

CABLE HAVING EMBEDDED OPTICAL FIBER

BACKGROUND OF THE INVENTION

The field of the invention is optical transmission cables.

One type of optical transmission cable consists of an outer portion having one or more sleeves and strength layers and a core consisting of one or more discrete bundles of optical fibers, the bundles henceforth called cable elements. The cable elements may be separated from each other and the outer portion of the cable by a filling compound.

The use of optical transmission cables as major trunk cables has been accepted for some years. The present need is for cost effective cable designs which allow a small number of fibers to be branched off at pedestals or the like to serve individual subscribers or groups of subscribers living on the same street.

If the cable contains a large number of fibers, a way must be found to distinguish among the various fibers. Since twelve colors are standardized by Bellcore, one way to discriminate among fibers by color is to have up to twelve fibers in each cable element and allow up to twelve cable elements in a cable. It would also be highly useful for the cable design to allow one or two fibers to be separated from a cable without destroying the functionality of a cable element.

Prior cable designs allow for the possibility of completely encasing optical fibers in a layer of plastic around a strength member. However, such a design does not allow for easy removal of optical transmission fibers from a cable. Designs which allow ease of removal will facilitate extension of the optical fiber network to individual subscribers.

SUMMARY OF TUE INVENTION

In order to address these needs, an optical transmission cable of this invention can be employed. Within the inner sheath is a core composed of a plurality of cable elements in a filling compound. The cable elements are composed of an element antibuckling member, a plastic layer applied directly over the element antibuckling member, and a plurality of optical fibers embedded in the plastic layer to a depth in which a portion, but not all, of the longitudinal surface of the optical fibers are not covered by the plastic layer. If the plastic layer is silicone rubber, the optical fibers may then be peeled away from an element by hand.

A system of tensile strength members and antibuckling members are then provided between the inner and outer tubular sheaths.

BRIEF DESCRIPTION OF THE DRAWINGS

The preferred embodiment is explained with reference to the drawings, in which.

DETAILED DESCRIPTION OF THE PREFERRED EMBODIMENT

Figure 2:
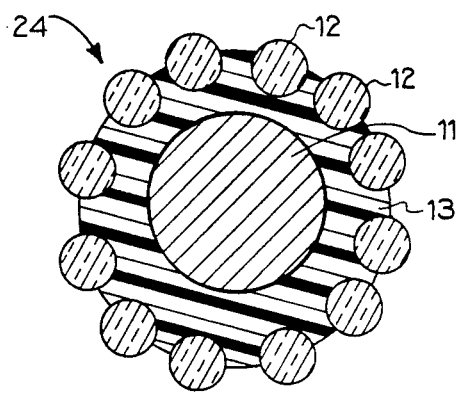
FIG. 2 is a cross section of an individual cable element as shown in FIG. 1.

Shown in FIG. 2 is a cross section of cable element 24, having glass reinforced plastic member 11, which acts as an antibuckling member; silicone rubber coating 13 applied directly over glass reinforced plastic member 11; and a plurality of optical fibers 12 embedded in coating layer 13 to a depth in which a portion, but not all, of the longitudinal surface of optical fibers 12 are not covered by coating layer 13.

Figure 1:
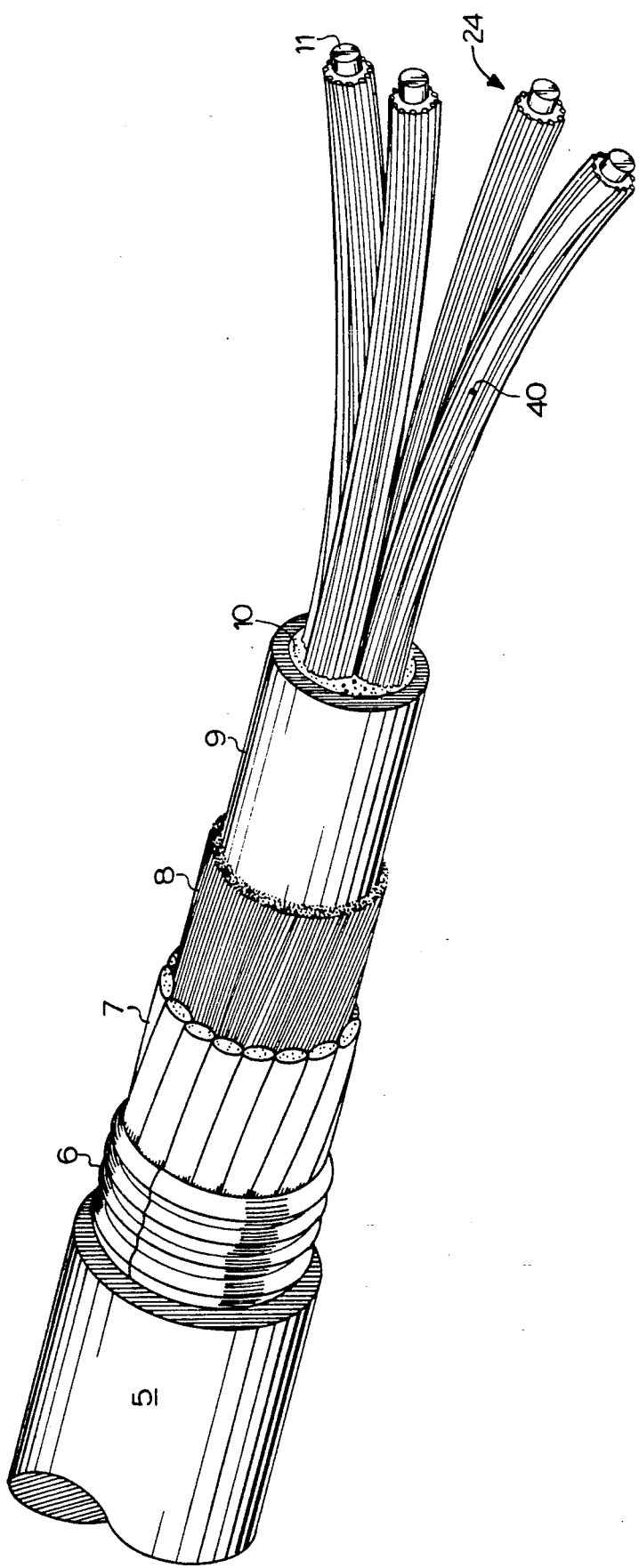
FIG. 1 is cutback perspective view of a cable according to the preferred embodiment.

The complete structure of the preferred embodiment is shown in FIG. 1, in which a plurality of elements 24 are contained in inner plastic tube 9 along with filling compound !0. Between inner plastic tube 9 and outer plastic tube 5 are disposed corrugated steel tape 6 to inhibit rodent damage, a layer 7 of polyurethene impregnated fiberglass marketed by PPG Industries under the tradename Hercuflex HF-2000, and a layer of densely packed loose fiberglass 8. Layer 7 provides antibuckling protection and layers 7 and 8 provide tensile strength.

It is found that optical fibers 12 may be peeled away by hand in this construction, which allows a pair of optical fibers to be dropped off at a pedestal. Optical fibers such as 40 in FIG. 1 may also be shorter than the remaining fibers if the cable is made for a particular installation.

Figure 4:
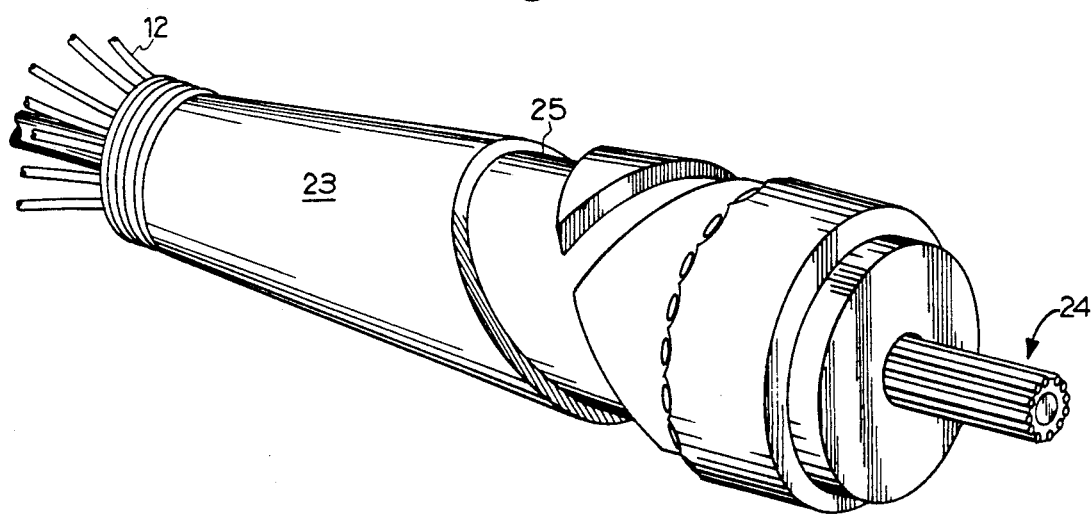
Figure 3:
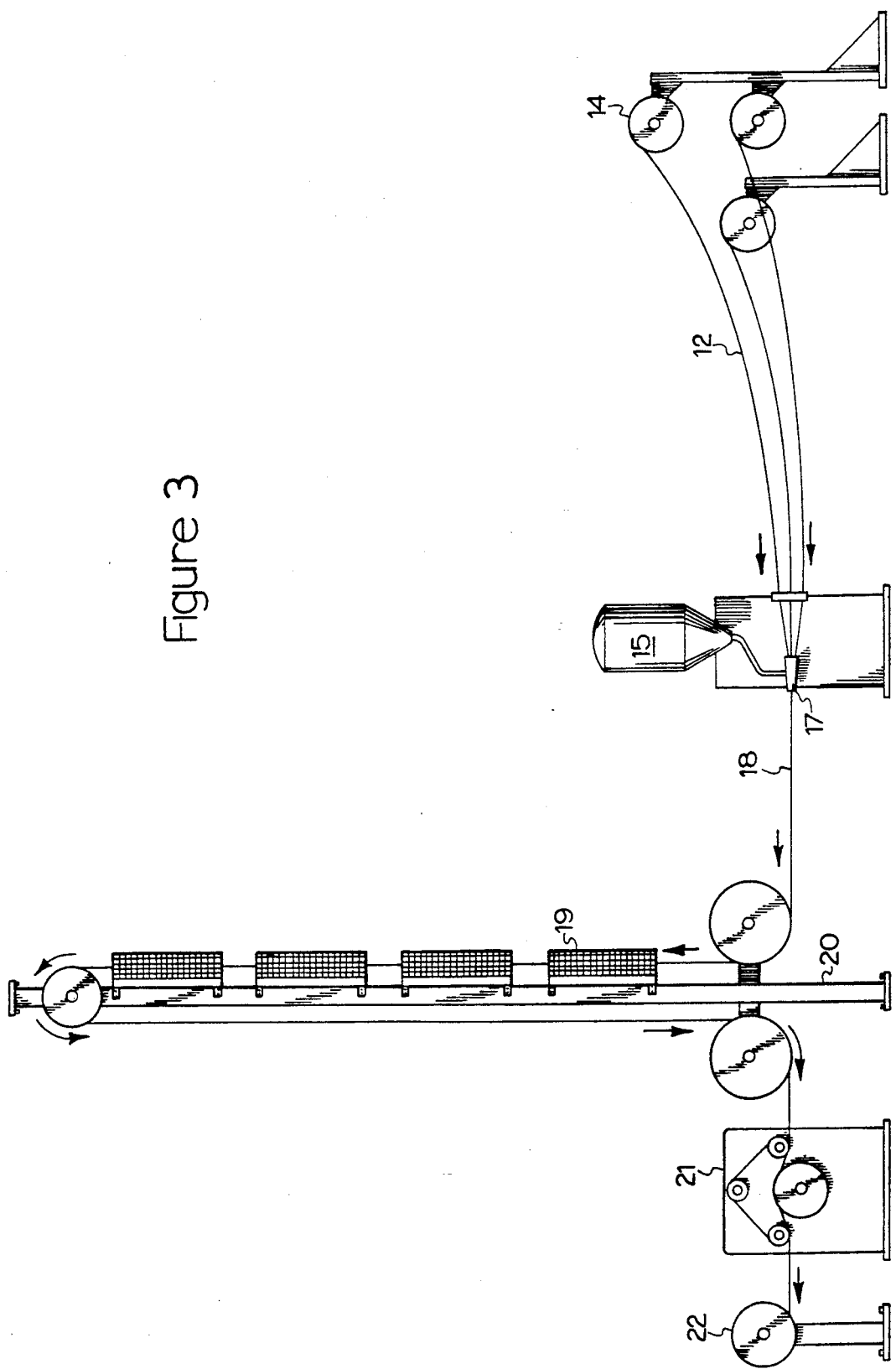
FIG. 3 depicts a manufacturing line for making a cable element as shown in FIG. 2; and, FIG. 4 is a perspective view of a part of the pressure extrusion portion of the manufacturing line.

The preferred method for making the outer portion of the cable is known to those of ordinary skill in the art; see the commonly assigned U.S. Pat. No. 4,892,382, incorporated herein by reference. The preferred method for making element 24 is illustrated in FIGS. 3 and 4. Optical fibers 12 are paid off from spools 14 and proceed to crosshead extruder 17. Central member 11 is paid off with a tension of 100 cN and optical fibers 12 are paid off with a tension of 40 cN. Silicone rubber is pumped from tank 15 by a gear pump set at 1.2 RPM into extruder head 17. As shown in FIG. 4, optical fibers 12 enter into the interior of die inner member 23, while silicone rubber 13 flows through channels 25 to an array of entrance holes as shown. The outer diameter of the exit hole is kept small enough so that silicone rubber 13 does not completely cover optical fibers 12. The element is then cured by vertical ovens 19 set at 250, 270, and 300° C. and is taken up by capstan 21 at a line speed of 35 m/min leading to take up reel 22.

What is claimed is:

1. An optical transmission cable, comprising:
   an outer plastic tube;
   an inner plastic tube within the outer plastic tube;
   a set of tensile strength members disposed between the outer plastic tube and the inner tube;
   a plurality of cable elements disposed within the inner plastic tube, each of said cable elements comprising an element anti-buckling member having a longitudinal axis, a plastic layer applied directly over the element anti-buckling member, and a plurality of optical fibers embedded in the plastic layer to a depth at which a portion, but not all, of the longitudinal surface of the optical fibers are not covered by the plastic layer; and,
   a filling compound filling the interstices between the cable elements and the inner tube.

2. An optical transmission cable as recited in claim 1 wherein the plastic layer applied directly over the element antibuckling member is silicone rubber.

3. An optical transmission cable as recited in claim 1, further comprising a set of antibuckling members disposed between the outer plastic tube and the inner plastic tube.

4. An optical transmission cable as recited in claim 3, wherein the plastic layer applied directly over the element antibuckling member is silicone rubber.

* * * * *